(12) United States Patent
Fleming

(10) Patent No.: US 6,496,303 B1
(45) Date of Patent: Dec. 17, 2002

(54) ULTRA-BROADBAND LOW-NOISE GAIN-FLATTENED RARE-EARTH-DOPED FIBRE AMPLIFIER

(75) Inventor: Simon Charles Fleming, Ashfield (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/600,252
(22) PCT Filed: Mar. 3, 1999
(86) PCT No.: PCT/AU99/00129
§ 371 (c)(1),
(2), (4) Date: Sep. 21, 2000
(87) PCT Pub. No.: WO99/45418
PCT Pub. Date: Sep. 10, 1999

(30) Foreign Application Priority Data

Mar. 4, 1998 (AU) .................................................. 2181

(51) Int. Cl.⁷ ............................ G02B 6/34; G02B 6/22; H04B 10/12
(52) U.S. Cl. ............................... 359/337.1; 359/337.2; 359/337.21; 385/37; 385/126
(58) Field of Search ........................ 359/337.1, 337.2, 359/337.22, 349; 385/24, 27, 28, 30, 31, 39, 42, 48, 50, 126, 37

(56) References Cited

U.S. PATENT DOCUMENTS

| 5,067,789 A | * | 11/1991 | Hall et al. ..................... 385/27 |
| 5,260,823 A | | 11/1993 | Payne et al. ................. 359/341 |
| 5,271,024 A | | 12/1993 | Huber ........................... 372/6 |
| 5,428,695 A | * | 6/1995 | Ohta ............................ 385/11 |
| 5,430,817 A | | 7/1995 | Vengsarkar .................. 385/37 |
| 5,546,481 A | * | 8/1996 | Meltz et al. .................. 385/11 |
| 5,805,751 A | * | 9/1998 | Kewitsch et al. ............. 385/37 |
| 5,930,435 A | * | 7/1999 | Laming et al. ............. 385/126 |
| 6,005,999 A | * | 12/1999 | Singh et al. ................ 385/127 |
| 6,058,226 A | * | 5/2000 | Starodubov ............ 250/227.11 |
| 6,204,958 B1 | * | 3/2001 | Taylor et al. ............... 359/130 |

FOREIGN PATENT DOCUMENTS

WO 93/076644 4/1993

OTHER PUBLICATIONS

Kashyap, R. et al. "Wavelength Flattened Saturated Erbium Amplifier using multiple side–tap Bragg gratings." Elect. Lett. 29:1 May 1993. pp. 1025–1026.*

(List continued on next page.)

Primary Examiner—Thomas H. Tarcza
Assistant Examiner—Andrew R Sommer
(74) Attorney, Agent, or Firm—Foley & Lardner

(57) ABSTRACT

An optical amplifier waveguide provides variable amplification gain to a broad wavelength input signal. The degree of amplification is proportional to the length of the transmission of the input signal along the amplification waveguide. The amplification waveguide means further comprises a series of output wavelength couplers, which are preferably fiber gratings, placed along the length of the amplification waveguide for coupling a predetermined amplified signal from the amplification waveguide to the output fiber. Additionally, the optical amplifier waveguide of the present invention may include a plurality of noise wavelength coupling means, which are preferably fiber gratings, for coupling unwanted noise from the amplification waveguide means to a noise dissipation means.

31 Claims, 3 Drawing Sheets

OTHER PUBLICATIONS

Tachibana, M. et al. "Erbium–Doped Fiber Amplifier with Flattened Gain Spectrum." IEEE Photonics Tech. Lett. 3:2, Feb., 1991. pp. 118–120.*

Tjugiarto, T. et al. "Bandpass Filtering Effect in Tappered Asymmetrical Twin–core Optical Fibres." Elect. Lett. 29:12, Jun. 1993. pp. 1077–1078.*

Pastor, D. et al. "Inter Channel Power Equalization and ASE Noise Rejection in a MultiStage EDFA Amplified WDM System Employing Fiber Gratings." IEEE, 1997. pp. 14/1–14/6.*

Atkins, G.R. et al. "UV Tuning of coupling in twin–core optical fibres." Elect. Lett. 30:25, Dec. 1994, pp. 2165–2166.*

Wilkinson, M. et al. "D–Fibre Filter for Erbium Gain Spectrum Flattening." Elect. Lett. 28:2, Jan., 1992. pp. 131–132.*

Gautheron, O. et al. "Optical Gain equalisation with short period fiber gratings." ECOC 1997, Sep. 1997. pp. 131–13.*

* cited by examiner

ULTRA-BROADBAND LOW-NOISE GAIN-FLATTENED RARE-EARTH-DOPED FIBRE AMPLIFIER

FIELD OF THE INVENTION

The present invention relates to amplification of optical signals and in particular those signals transmitted through optical fibres and amplified utilising a rare-earth doped fibre amplifier.

BACKGROUND OF THE INVENTION

Recently, the utilisation of optical fibres for communications has become increasingly popular due to their high bandwidth capabilities. The wavelengths normally utilised for optical fibre transmission have been traditionally related to the low attenuation areas of the transmission spectrum of a single mode optical fibre. Turning initially to FIG. 1, there is illustrated the spectrum of a typical attenuation rate for single mode optical fibres. The figure indicates two particular windows of interest for low loss transmission, the first being at approximately 1550 nm and the second at 1310 nm. The window at 1550 nm has become particularly popular for its low attenuation rate.

Recently the all optical rare-earth doped fibre amplifiers have also become increasingly popular for providing for the all optical amplification of an input signal. One particular form of amplifier in popular use is the Erbium doped fibre amplifier (EDFA) which has particularly strong amplification also in the 1550 nm region. FIG. 2 illustrates an example of the gain provided by a standard EDFA for different pumping powers (normalised to one with the gain also normalised to one). As can be seen from FIG. 2, the gain profile of an EDFA is highly irregular. In the past, when only a single wavelength is transmitted by an optical fibre, this is not a problem. However, recently wavelength division multiplexed (WDM) systems have been proposed and constructed with, as the name suggests, the optical fibre carrying many different channels at different frequencies or wavelengths. Unfortunately, the amplification profile of an EDFA results in each channel experiencing a substantially different gain and hence a WDM system is likely to be problematic for amplification by a EDFA amplifier unless the gain profile can be held to be substantially constant. It will, of course, be noted from FIG. 2 that an EDFA normally provides a degree of useable gain across a broad spectrum of suitable wavelengths however, as can be clearly seen from FIG. 2, the gain spectrum is "swamped" by the central peak.

SUMMARY OF THE INVENTION

In accordance with a first aspect of the present invention there is provided an optical amplifier for a broadband signal comprising an amplification waveguide having a gain per length of transmission that depends on the wavelength of a signal to be amplified; a first plurality of first coupling means positioned along the length of the amplification waveguide, each coupling means arranged to couple light of an associated selected wavelength from the amplification waveguide to an output means of the optical amplifier; and wherein the respective coupling means are positioned so that the gain experienced in the amplification waveguide is substantially equal for the different associated wavelengths.

The first plurality of first coupling means may be formed within the amplification waveguide.

The first plurality of first coupling means may alternatively be formed within the output means.

The output means may comprise an output waveguide.

The first coupling means may each comprise an optical grating. The grating may comprise a long period plating.

The amplification waveguide may comprise the core of an optical fibre.

In one embodiment, the output means is formed in the cladding of the optical fibre.

The output means may comprise a further core of the optical fibre.

The amplification waveguide may be formed from a rare earth-doped glass. The rare earth element may be erbium.

The optical amplifier may further comprise a second plurality of second coupling means positioned along the length of the amplification waveguide, each coupling means arranged to couple light of an associated selected wavelength from the amplification waveguide to a noise dissipation means; and the respective second coupling means are positioned after a corresponding one of the first coupling means having the same associated wavelength, so that residual signal of the same wavelength is coupled from the amplification waveguide to the noise dissipation means.

The noise dissipation means may comprise a waveguide.

The second coupling means may comprise a grating.

The second coupling means may be formed in the amplification waveguide. Alternatively, the second coupling means may be formed in the noise dissipation means.

The second coupling means may further be arranged to couple other noise from the amplification waveguide into the noise dissipation means.

In accordance with a second aspect of the present invention there is provided a method of optically amplifying a broad wavelength signal comprising the steps of amplifying the broad wavelength signal in an amplification waveguide having a gain per length of transmission that depends on the wavelength of a signal to be amplified; coupling a plurality of components of the broad wavelength signal from the amplification waveguide to an output means; and wherein each of the components is coupled from the amplification waveguide at a position such that the gain experienced in the amplification waveguide is substantially equal for the different components.

The method may further comprise the step of coupling a plurality of components of the broad wavelength signal from the amplification waveguide to a noise dissipation means; and wherein each component is coupled from the amplification waveguide to the noise dissipation means at a position after the position at which a component of the same wavelength is coupled from the amplification waveguide to the output means to couple residual signal of that wavelength from the amplification waveguide.

In accordance with a third aspect of the present invention there is provided an optical fibre having a plurality of cores, the cores having differing respective propagation constants at a predetermined wavelength, wherein a long period grating is provided in at least one of the cores, the long period grating being configured such that, in use, it matches the propagation constant of said core at the predetermined wavelength to the propagation constant of another one of the cores for coupling of light from said core into the other core.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment an erbium doped fibre amplifier is utilised in conjunction with a grating system to transfer the signal associated with each wavelength from an input channel to an output channel at a position determined by the expected gain on the input signal at a particular wavelength. Subsequently, the amplification of noise associated with the input signal of the same wavelength is discarded or "dumped" to a dispersion or noise channel for dissipation. This process is repeated for each signal of interest.

Figure 1:
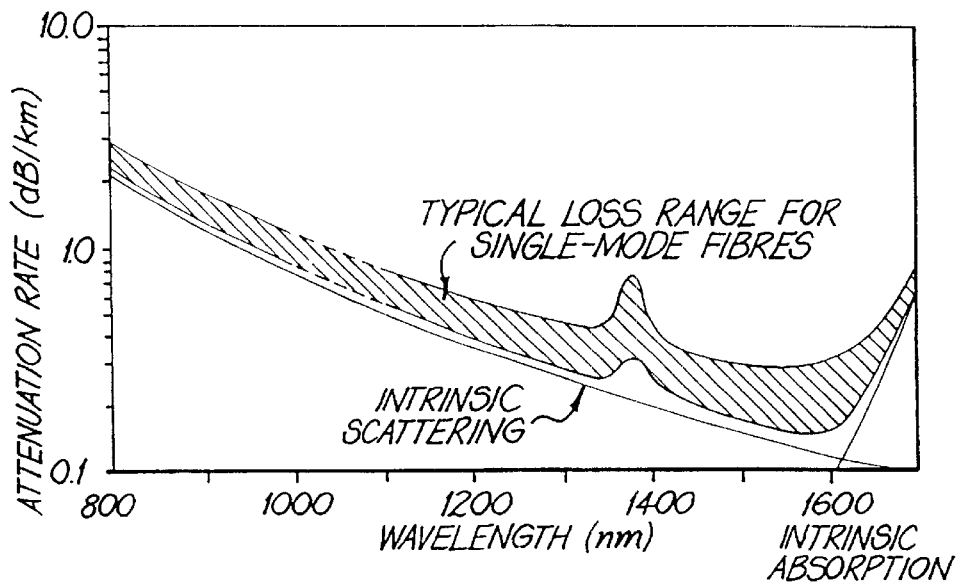
FIG. 1 illustrates the typical attenuation rate for single mode fibres.
Figure 2:
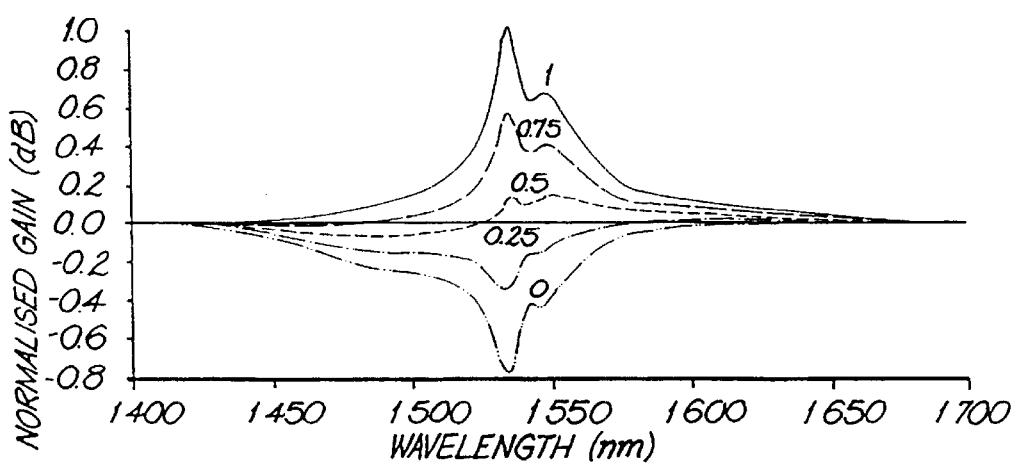
FIG. 2 illustrates a graph of amplification gain for an erbium doped fibre amplifier (EDFA) for different pumping levels.

In order to obtain a clear understanding of the preferred embodiment, an initial apparatus is proposed and discussed with reference to FIG. 3. In this design, an input signal 10 is fed to an Erbium doped amplifying core 11 which is placed in close proximity to a second non-amplifying core 12. The two cores 11, 12 exist within a cladding layer 13. Normally, whilst the two waveguides 11, 12 are placed in close proximity however, they are designed such that coupling between them does not occur (eg. by choice of core diameter and refractive index, which whilst providing similar cutoff wavelengths as needed gives differing propagation constants). The waveguide 11 can comprise an EDFA which is doped and pumped strongly. It potentially provides gain across a very large spectrum. However, as noted previously, the strong gain in the peak of the gain spectrum of FIG. 2 swamps the tails. There is a point along the length of the waveguide 11 where any wavelength within the gain band reaches a certain level of gain (say 30dB), those wavelengths at the gain peak experience this overall level of gain at the first part along the length of the amplifier waveguide 11 and those in the tail part of the gain band experience the level of gain in the last part of the waveguide 11. The gain flattening is achieved by coupling the two waveguides 11, 12 together at a certain point eg. 15–17 dependant on the amount of gain experienced at that point for the particular wavelength. The coupling can be provided by means of a grating written into the fibre. Preferably, long period gratings are utilised. The frequency of the grating written will be dependant upon the desired coupling wavelength. The coupling at point 15 can be for the wavelength receiving maximum gain near the gain peak whereas the coupling at the point 17 can be for the wavelength experiencing a much lower level of gain near the gain tail along the waveguide 11. Hence, the coupling point varies down the length of the fibre according to the wavelength. The position of the gratings eg. 15–17. being adjusted such that the output gain of the output signal 18 is substantially the same for all wavelengths, thereby achieving gain flattening.

Figure 3:
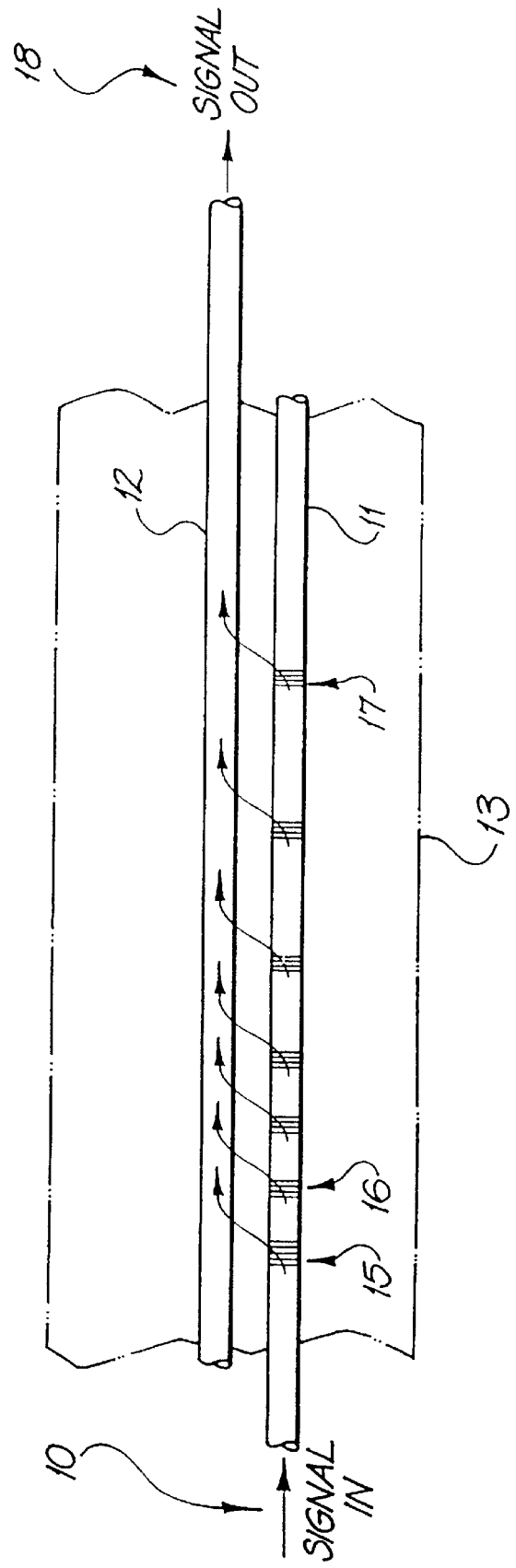
FIG. 3 illustrates in schematic form a first illustrative arrangement discussed with reference to the preferred embodiment.

Unfortunately, the arrangement of FIG. 3 does not take into account any noise or residual signal that, for example, is not coupled out of the grating 15. Unfortunately, down the subsequent length of the waveguide 11, the residual noise (and signal which was supposed to be coupled out at the point 15) will be amplified dramatically thereby absorbing energy within the waveguide 11 which would otherwise be utilised to amplify other wavelengths. With the very high gains in the channel 11 at the gain peak, spontaneous emissions will potentially experience sufficient amplification to cause lasing. However, the device of FIG. 3 may still be suitable in its own right.

Figure 4:
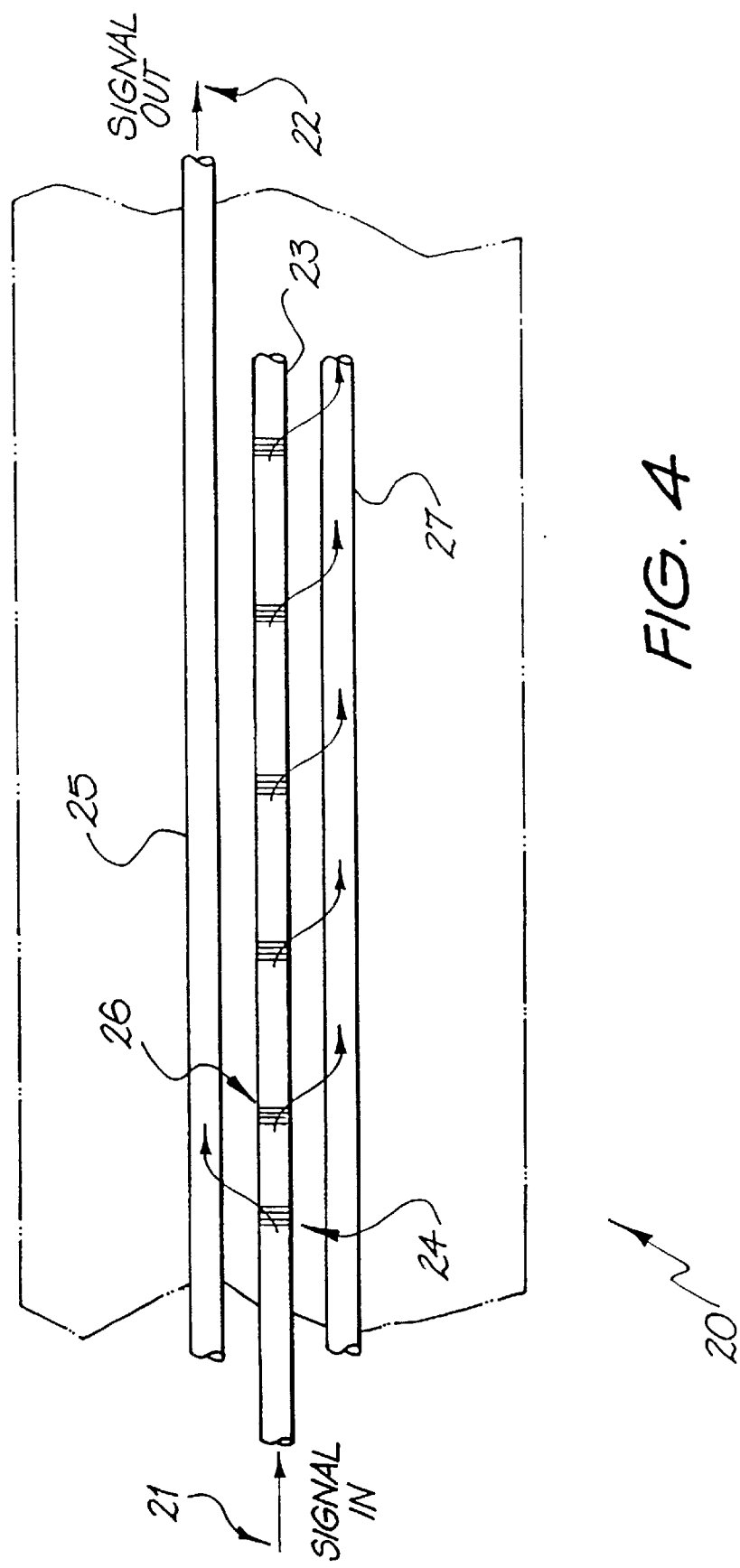
FIG. 4 illustrates, in schematic form, one form of the preferred embodiment of the present invention.

Turning now to FIG. 4, there is illustrated an alternative more suitable arrangement 20. This arrangement is similar to that illustrated in FIG. 3 and includes broadband input signal 21 and amplified output signal 22. An EDFA amplifier is provided 23 and pumped in the usual manner. Taking the example of one wavelength only, a first coupling is provided 24 for coupling the signal to output waveguide 25 as previously described. Along the rest of the fibre a series of gratings eg. 26 are provided for coupling any residual signal and amplified noise from the waveguide 23 to a noise dissipation waveguide 27 with the grating 26 being particularly tuned so as to provide for coupling directly to the noise dissipation waveguide 27. If desired, the noise dissipation waveguide 27 can be the cladding of the fibre. The waveguide 27 provides a convenient place to dump the amplified noise before it can accumulate and deplete the gain or cause lasing. In the simple case, as noted previously, the waveguide 27 can comprise the cladding. Alternatively, it could be a doped waveguide which is unpumped as a means for actively removing the noise. A series of gratings 26 canoe provided along the waveguide 23 after a first coupling waveguide 24 so as to minimise any amplification of the noise signals remaining after coupling to the output 25.

The arrangement 20 of FIG. 4 illustrates, for clarity, the processing of one wavelength only, with overlapping gratings being written so as to deal with other wavelengths so as to provide for both flat gain coupling to waveguide 25 in addition to noise dumping to waveguide 27. Hence, the preferred embodiment can include a multi-core fibre with coupling provided by overlapping long period gratings. The coupling to the waveguide 25 can occur at each point where the requisite wavelength reaches a certain gain with immediately after the coupling to the output channels 25 all subsequent noise associated with the output frequency being coupled to the "noise dumping" channel 27.

Of course, other arrangements are possible: For example, counter directional pumping might be utilised so as to provide for maximum tail gain; Codirectional and Bidirectional pumping are also possible. Alternatively, a fourth core waveguide could be introduced with appropriate gratings for distribution of the pumping energy in accordance with the needs. In other arrangements gratings can be written in the other waveguides. For example, the gratings could be written to the output and noise waveguides instead of the gain/input waveguides.

In a further alternative arrangement, the noise channel can comprise the cladding. Other arrangements can include, for example, a central output channel around which is circumferentially arranged the gain amplifier and input channel and further around which is circumferentially arranged the noise channel. The channels can alternatively be in a different order.

The principles of preferred embodiment can further be extended to other transmission windows. For example, in the 1300 nm window $Nd^{3+}$ in silica is known to provide gain in this region but is normally unusable because of strong competitive lasing combined with poor centring on the band of interest. If gain is provided across the whole band, then high efficiency outcoupling of problem parts of the spectrum may result in realistic silica amplifiers for the 1300 nm region.

An extension to the preferred embodiment permits efficient pumping of a gain medium from a multimode source. A multimode pump can be launched into a multimode core which runs close to a gain core. The cores are designed such that as far as is possible there is no coupling between either the signal or pump modes of the gain core and any of the modes of the pump core. Gratings are introduced to couple modes of the multimode pump to the fundamental mode of the pump in the gain channel. The spacing of the gratings along the fibre can be such as to allow for strong absorption of those components of the pump already coupled (so that there is negligible back-coupling). In this manner, each mode may be coupled over and absorbed. This has an advantage over existing schemes such as cladding pumping, where the absorption of the pump relies on a simple overlap and the efficiency scales with the areas of the waveguides. This scheme may be particularly advantageous for lasers as well as amplifiers.

Further, it is known that long period gratings are highly sensitive to perturbations. This can be used to effect tuning of the coupling and hence the overall performance. For instance, first order corrections for spectral gain variations due to changes in inversion from changes in signal or pump power could be corrected by, for instance strain or temperature, tuning of the long period gratings.

It would further be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. An optical amplifier for a broadband signal comprising:
   an amplification waveguide having a gain per length of transmission that depends on the wavelength of a signal to be amplified;
   a first plurality of first coupling means positioned along the length of the amplification waveguide, each coupling means arranged to couple light of an associated selected wavelength from the amplification waveguide to an output means of the optical amplifier, the output means comprising an output waveguide for transmission of an amplified signal; and
   wherein the respective coupling means are positioned so that the gain experienced in the amplification waveguide is substantially equal for the different associated wavelengths.

2. An amplifier as claimed in claim 1, wherein the first plurality of first coupling means are formed within the amplification waveguide.

3. An optical amplifier as claimed in claim 1, wherein the first plurality of first coupling means are formed within the output means.

4. An optical amplifier as claimed claim 1, wherein the first coupling means each comprise an optical grating.

5. An optical amplifier as claimed in claim 4, wherein the grating comprises a long period grating.

6. An amplifier as claimed in claim 1, wherein the amplification waveguide comprises the core of an optical fiber.

7. An amplifier as claimed in claim 6, wherein the output means is formed in the cladding of the optical fibre.

8. An amplifier as claimed in claim 7, wherein the output means comprises a further core of the optical fiber.

9. An amplifier as claimed in claim 1, wherein the amplification waveguide is formed from a rare earth-doped glass.

10. An amplifier as claimed in claim 9, wherein the rare earth element is Erbium.

11. An optical amplifier as claimed in claim 1, further comprising a second plurality of second coupling means positioned along the length of the amplification waveguide, each coupling means arranged to couple light of an associated selected wavelength from the amplification waveguide to a noise dissipation means; and wherein the respective second coupling means are positioned after a corresponding one of the first coupling means having the same associated wavelength, so that a residual signal of the same wavelength is coupled from the amplification waveguide to the noise dissipation means.

12. An amplifier as claimed in claim 11, wherein the noise dissipation means comprises a waveguide.

13. An amplifier as claimed in claim 12, wherein the second coupling means comprises a grating.

14. An amplifier as claimed in claim 12, wherein the second coupling means are formed in the amplification waveguide.

15. An amplifier as claimed in claim 12, wherein the second coupling means are formed in the noise dissipation means.

16. An amplifier as claimed in claim 12, wherein the second coupling means are further arranged to couple a noise signal from the amplification waveguide to the noise dissipation means.

17. An amplifier as claimed in claim 11 wherein the second coupling means comprises a grating.

18. An amplifier as claimed in claim 17, wherein the second coupling means are formed in the amplification waveguide.

19. An amplifier as claimed in claim 17, wherein the second coupling means are formed in the noise dissipation means.

20. An amplifier as claimed in claim 17, wherein the second coupling means are further arranged to couple a noise signal from the amplification waveguide to the noise dissipation means.

21. An amplifier as claimed in claim 11, wherein the second coupling means are formed in the amplification waveguide.

22. An amplifier as claimed in claim 21, wherein the second coupling means are further arranged to couple a noise signal from the amplification waveguide to the noise dissipation means.

23. An amplifier as claimed in claim 11, wherein the second coupling means are formed in the noise dissipation means.

24. An amplifier as claimed in claim 23, wherein the second coupling means are further arranged to couple a noise signal from the amplification waveguide to the noise dissipation means.

25. An amplifier as claimed in claim 11, wherein the second coupling means are further arranged to couple other noise signal from the amplification waveguide to the noise dissipation means.

26. A method of optically amplifying a broad wavelength signal comprising the steps of:
   amplifying the broad wavelength signal in an amplification waveguide having a gain per length of transmission that depends on the wavelength of a signal to be amplified;

coupling a plurality of components of the broad wavelength signal from the amplification waveguide to an output means, the output means comprising an output waveguide for transmission of an amplified signal; and wherein each of the components is coupled from the amplification waveguide at a position such that the gain experienced in the amplification waveguide is substantially equal for the different components.

27. A method as claimed in claim 26, further comprising the step of coupling a plurality of components of the broad wavelength signal from the amplification waveguide to a noise dissipation means; and wherein each component is coupled from the amplification waveguide to the noise dissipation means at a position after the position at which a component of the same wavelength is coupled from the amplification waveguide to the output means to couple a residual signal of that wavelength from the amplification waveguide.

28. An optical amplifier for a broadband signal comprising:

an amplification waveguide having a gain per length of transmission that depends on the wavelength of a signal to be amplified; and a plurality of first couplers positioned along the length of the amplification waveguide, each first coupler arranged to couple light of an associated selected wavelength from the amplification waveguide to an output waveguide for transmission of an amplified signal;

wherein the respective first couplers are positioned so that the gain experienced in the amplification waveguide is substantially equal for the different associated wavelengths.

29. An optical amplifier as claimed in claim 28, wherein the first couplers comprise an optical grating.

30. An optical amplifier as claimed in claim 29, wherein the grating comprises a long period grating.

31. An optical amplifier as claimed in claim 28, further comprising a plurality of second couplers positioned along the length of the amplification waveguide, each second coupler arranged to couple light of an associated selected wavelength from the amplification waveguide to a noise dissipator; and wherein the respective second couplers are positioned after a corresponding one of the first couplers having the same associated wavelength, so that a residual signal of the same wavelength is coupled from the amplification waveguide to the noise dissipator.

* * * * *